United States Patent [19]

Van Niel

[11] 4,006,877
[45] Feb. 8, 1977

[54] BICYCLE REFLECTOR CLIP

[75] Inventor: Clarence R. Van Niel, North Olmsted, Ohio

[73] Assignee: Eaton Corporation, Cleveland, Ohio

[22] Filed: May 27, 1976

[21] Appl. No.: 690,349

[52] U.S. Cl. .......................... 248/466; 248/222.3; 248/359; 403/188
[51] Int. Cl.² ........................................ F16M 13/00
[58] Field of Search ............ 248/73, 125, 223, 225, 248/359, 360, 466; 403/188

[56] References Cited
UNITED STATES PATENTS

| | | | |
|---|---|---|---|
| 2,104,192 | 1/1938 | Ford | 403/188 X |
| 2,192,644 | 3/1940 | La May et al. | 403/343 X |
| 2,616,051 | 10/1952 | Baum | 248/223 X |
| 3,066,665 | 12/1962 | Reilly | 248/125 UX |
| 3,134,565 | 5/1964 | Trifiletti | 248/466 |
| 3,381,824 | 5/1968 | Blumenschein | 248/125 X |
| 3,588,020 | 6/1971 | Newcomer | 248/225 |

Primary Examiner—William H. Schultz
Attorney, Agent, or Firm—Teagno & Toddy

[57] ABSTRACT

A one-piece spring clip for mounting a flat member on a rod-like member. The clip is disposed within an aperture in the flat member and includes a body portion defining oppositely disposed slots extending axially from the end of the clip adjacent the rod-like member, and then circumferentially to permit rotation of the clip from a disengaged position to an engaged position. As the clip is rotated toward the engaged position, and the rod-like member passes through the circumferential slots, the rod-like member is drawn into engagement with the rearward surface of the flat member, thereby preventing substantial relative movement between the flat member and the rod-like member.

12 Claims, 9 Drawing Figures

BICYCLE REFLECTOR CLIP

BACKGROUND OF THE DISCLOSURE

The present invention relates to one-piece spring clips, and more particularly, to such clips which are used for mounting a flat member on a rod-like member to prevent substantial movement of the flat member relative to the rod-like member, along the axis thereof.

Although it will become apparent to those skilled in the fastener art that the present invention may be utilized with a variety of assemblies of a flat member and a rod-like member, the present invention is especially adapted for mounting a bicycle reflector (flat member) on a spoke (rod-like member) of a bicycle wheel, and the invention will be described in connection therewith.

Accordingly, it is an object of the present invention to provide an improved one-piece spring clip adapted to mount a flat member such as a bicycle reflector to a rod-like member such as the spoke of a bicycle wheel.

It is a more specific object of the present invention to provide such an improved one-piece spring clip which draws the rod-like member into tight engagement with the flat member during installation of the clip and which subsequently utilizes the tensile stress induced in the clip during installation thereof to maintain the tight engagement between the flat member and the rod-like member.

It is another object of the present invention to provide a one-piece spring clip which satisfies the above-stated objects and which is easily removable, to permit disassembly of the flat member and rod-like member, without destruction of the clip.

SUMMARY OF THE INVENTION

The above and other objects of the present invention are accomplished by the provision of an improved one-piece spring clip for mounting a flat member fixed relative to a rod-like member, wherein the flat member has an aperture extending therethrough and defines an axis, the axis intersecting the rod-like member and being generally perpendicular thereto. The spring clip comprises a generally tubular body portion having a head end and an opposite end and adapted to be disposed within the aperture of the flat member. The body portion defines first and second oppositely-disposed slots extending axially from the opposite end and first and second oppositely-disposed slots extending circumferentially from the first and second axial slots, respectively. Each of the circumferential slots includes a terminal portion adapted to have the rod-like member extending therethrough. The distance from the circumferential slot to the head end as well as the distance from the terminal portion to the head end are less than the thickness of the flat member adjacent the aperture to cause the rod-like member to be drawn into a groove defined by the flat member. Preferably, the distance from the rear surface of the circumferential slot to the head end of the body portion is greater adjacent the axial slot than adjacent the terminal portion such that rotation of the spring clip in a direction causing the rod-like member to move toward the terminal portion will, at the same time, force the rod-like member further into the groove defined by the flat member.

DESCRIPTION OF THE PREFERRED EMBODIMENT

Figure 1:
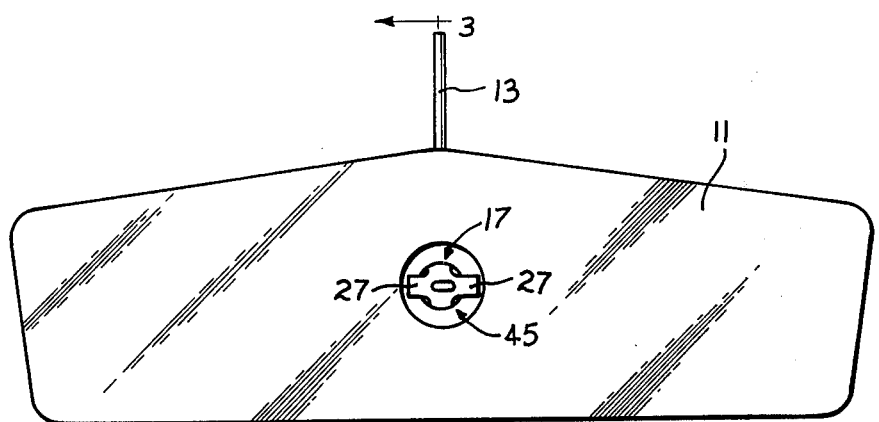
FIG. 1 is a front elevation of a bicycle reflector and spoke assembly utilizing the present invention.
Figure 2:
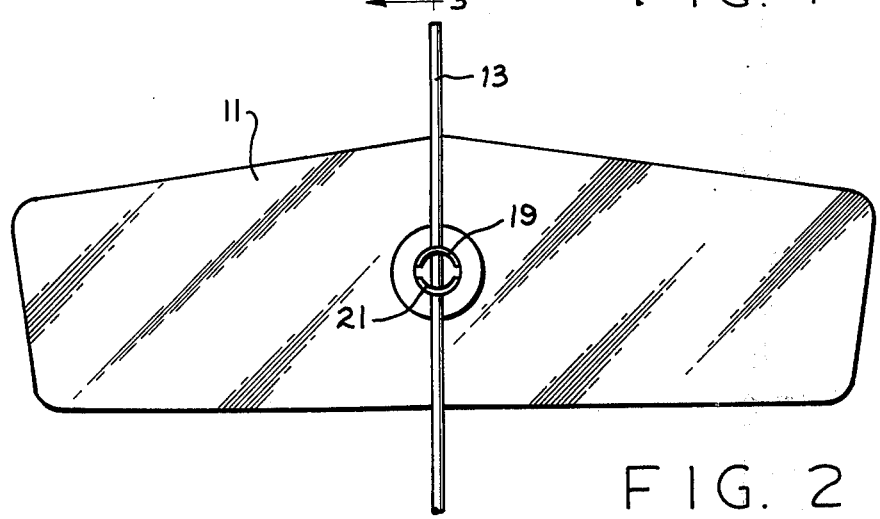
FIG. 2 is a rear elevation of the assembly of FIG. 1.

Referring now to the drawings, which are not intended to limit the present invention, FIGS. 1 and 2 illustrate the use of the invention in mounting a bicycle reflector 11 on a spoke 13 of a bicycle wheel. As may best be seen in FIG. 3, the spoke 13 is drawn into a groove 15 formed in the rearward surface of the reflector 11 by means of a clip, generally designated 17, which is located within an aperture 16, extending through the reflector 11 and defining an axis oriented generally perpendicular to the axis of the spoke 13. Referring now to FIGS. 4 through 7, the spring clip 17 will be described in greater detail. The spring clip 17 preferably comprises a one-piece spring steel stamping including a generally tubular body portion comprising a pair of oppositely-disposed body halves 19 and 21. The body halves 19 and 21 are joined at their upper extremities by a bight portion 23 which defines a slot 25 to permit rotation of the clip 17 during assembly or disassembly, such as by means of a screwdriver. The bight portion 23 further includes a pair of oppositely disposed tabs 27, the purpose of which will be discussed subsequently.

The body halves 19 and 21 are formed to define a pair of oppositely disposed slots 29, each of the slots 29 extending axially from the end of the body portion opposite the bight portion 23 toward the bight portion 23. It will be apparent that the width of each of the axial slots 29 should be at least slightly greater than the diameter of the spoke 13 to permit passage of the spoke 13 through the slots 29. It should be understood that it is not an essential feature of the present invention that the slots 29 extend the entire length of the body portion as shown in FIG. 6, but it has been found that the configuration shown facilitates manufacture of the clip 17 as a single stamping and with a minimum waste of material.

Figure 3:
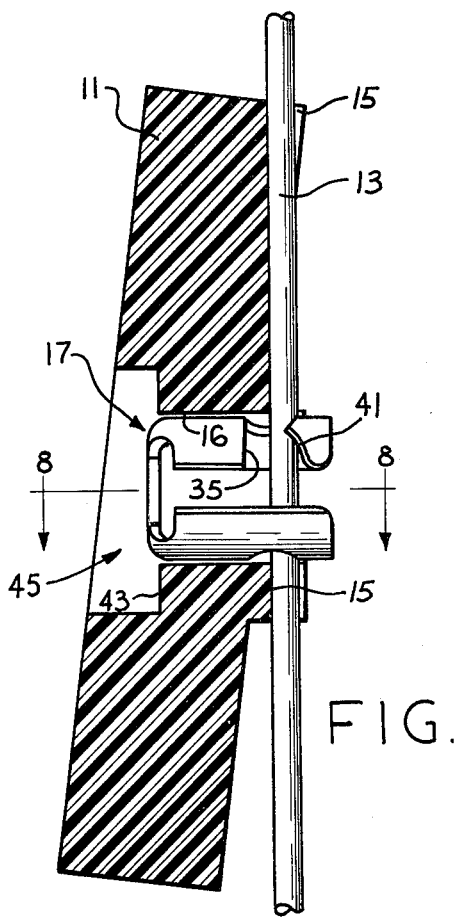
FIG. 3 is a cross section, taken on line 3—3 of FIG. 1, and on a scale approximately three times that of FIG. 1.
Figure 4:
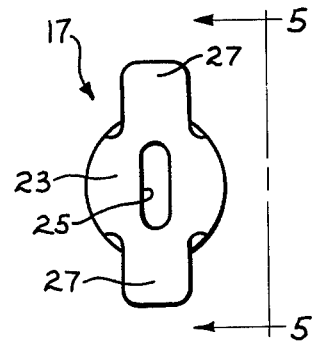
FIG. 4 is a top plan view of the spring clip of the present invention, on the same scale as FIG. 3.
Figure 5:
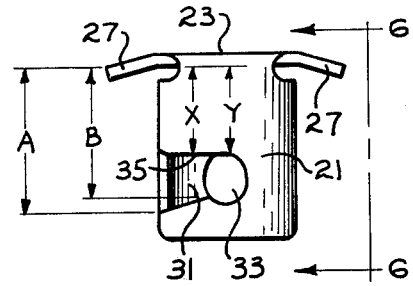
FIG. 5 is a side elevation of the spring clip, taken on line 5—5 of FIG. 4, and on the same scale.
Figure 6:
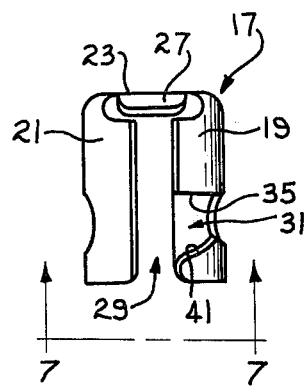
FIG. 6 is a side elevation of the spring clip, taken on line 6—6 of FIG. 5, and on the same scale.
Figure 7:
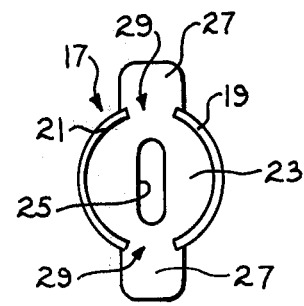
FIG. 7 is a bottom plan view taken on line 7—7 of FIG. 6, and on the same scale.

As may best be seen in FIGS. 5 and 6, the body halves 19 and 21 define a pair of oppositely disposed slots 31, each of which extends circumferentially about the body portion and opens to the adjacent axial slot 29. Each of the circumferential slots 31 terminates, at the end opposite the opening to the slot 29, in a generally circular terminal portion 33, which is shown as being a little larger than the diameter of the spoke 13. As is shown in FIGS. 3 and 6, each of the circumferential slots 31 includes a forward slot surface 35 and in FIG. 5, the distance from the forward slot surface 35 to the underside of bight portion 23 has been labeled X, while the distance from the terminal portion 33 to the underside of the bight portion 23 has been labeled Y. Preferably, each of the distances X and Y are less than the thickness of the reflector 11 adjacent the aperture 16.

In addition, each of the circumferential slots 31 includes a rearward slot surface 41 and, as is shown in FIG. 5, the distance from the rearward slot surface 41 to the underside of the bight portion 23, adjacent the respective axial slot 29, is designated A. The distance from the rearward slot surface 41 to the underside of the bight portion 23, adjacent the terminal portion 33 is designated B, and preferably, the distance B is less than the distance A for reasons which will be described subsequently.

Figure 8:
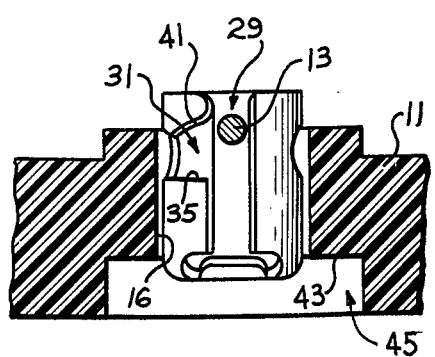
FIGS. 8 and 9 are similar cross sections, taken on line 8—8 of FIG. 3, illustrating the disassembled condition in FIG. 8 and the assembled condition in FIG. 9.
Figure 9:
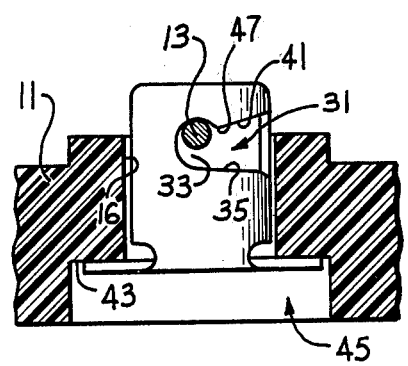

Referring now to FIGS. 8 and 9, the installation of the clip 17 in a reflector-and-spoke assembly is illustrated. Before describing the installation of the clip 17, it should be noted, by reference to FIGS. 5 and 8, that the oppositely disposed tabs 27 are initially bent slightly downward (i.e., toward the body portion). In FIG. 8 is illustrated the disassembled condition with the spoke 13 loosely disposed within the groove 15 and with the clip 17 disposed to have the spoke 13 extending through the oppositely disposed axial slots 29. In the disassembled condition, the tabs 27 remain bent slightly toward the body portion, with the undersides of the tabs 27, adjacent the outer extremities thereof, engaging a forward surface 43 defined by a recess 45 formed in the reflector 11.

Installation of the clip 17 is accomplished by rotating the clip 17, in the manner described previously, from the position shown in FIG. 8 to that shown in FIG. 9. In the subject embodiment, this installation involves rotating the clip 17 approximately 90°, during which time the spoke 13 is in sliding engagement with each of the rearward slot surfaces 41 as the spoke 13 moves through each of the circumferential slots 31 toward the oppositely disposed terminal portions 33. Because, in the subject embodiment, the distance A is greater than the distance B, rotation of the clip 17 from the position shown in FIG. 8 to that shown in FIG. 9 draws the spoke 13 further into the groove 15, and in tighter engagement therewith which, at the same time, causes the tabs 27 to assume the flattened configuration shown in FIG. 9, and face-to-face engagement with the surface 43. As may be seen in FIG. 9, after the clip 17 is rotated to the assembled position, the spoke 13 is maintained within the terminal portion 33 by means of a projection 47 defined by the intersection of the rearward slot surface 41 and the terminal portion 33. Therefore, disassembly of the reflector and spoke can be accomplished only by rotating the clip 17 back to the position shown in FIG. 8, and cannot occur merely by the normal vibration which occurs during usage.

I claim:

1. A one-piece spring clip for mounting a first member fixed relative to an elongated second member, the first member having an aperture extending therethrough defining an axis, the axis intersecting the elongated second member and being generally perpendicular thereto, said spring clip comprising:
   a. a generally tubular body portion having a head end and an opposite end and adapted to be disposed within the aperture of the first member;
   b. said body portion defining first and second oppositely-disposed slots extending axially from said opposite end;
   c. said body portion defining first and second oppositely-disposed slots extending circumferentially from said first and second axial slots, respectively, each of said circumferential slots having a terminal portion contiguous therewith and adapted to receive said elongated member extending therethrough;
   d. said tubular body portion defining a distance X from said circumferential slot to said head end and a distance Y from said terminal portion to said head end, both of said distances X and Y being less than the thickness of the first member adjacent the aperture.

2. A one-piece spring clip as claimed in claim 1 including a pair of tabs extending radially-outwardly from said head end for engagement with the first member.

3. A one-piece spring clip as claimed in claim 1 wherein said head end defines means for selectively imparting rotational movement to said clip.

4. A one-piece spring clip as claimed in claim 2 wherein each of said pair of tabs has its outer extremity bent slightly toward said body portion.

5. A one-piece spring clip as claimed in Claim 1 wherein each of said circumferential slots includes a rearward slot surface, disposed toward said opposite end of said body portion, said rearward slot surface and said head end defining a distance A adjacent the respective axial slot, and defining a distance B adjacent the respective terminal portion, the distance A being greater than the distance B.

6. A one-piece spring clip for mounting a first member relative to an elongated second member, the first member having an aperture extending therethrough defining an axis, the axis intersecting the elongated second member, said spring clip comprising:
   a. a generally tubular body portion having a head end and an opposite end and sized to be disposed within the aperture defined by the first member;
   b. said body portion comprising first and second oppositely-disposed body halves and said head end comprising a bight portion joining said first and second body halves and formed integrally therewith;
   c. said first and second body halves cooperating to define first and second oppositely-disposed axial slots extending from said opposite end of said body portion toward said head end;
   d. said first and second body halves defining respectively, first and second oppositely-disposed circumferential slots, each of said circumferential slots communicating with one of said axial slots and including a terminal portion adapted to receive said elongated second member passing therethrough;
   e. each of said circumferential slots including a rearward slot surface, disposed toward said opposite end of said body portion, said rearward slot surface and said bight portion defining a distance A adjacent the respective axial slot, and defining a distance B adjacent the respective terminal portion, the distance A being greater than the distance B.

7. In combination, a first member defining a forward surface, a rearward surface, an aperture extending through said first member and oriented generally perpendicular to said forward and rearward surfaces, an elongated second member disposed adjacent said rearward surface of said first member, and a onepiece spring clip for mounting said first member fixed relative to said second member, said spring clip comprising a generally tubular body portion disposed within said aperture and having a forward end and a rearward end, said body portion defining first and second oppositely-disposed slots adapted to receive said second member therein and extending axially from said rearward end, said body portion further defining first and second oppositely-disposed slots adapted to receive said second member therein and extending circumferentially from said first and second axial slots, respectively, the distance from each of said first and second circumferential slots to said forward end of said body portion being less than the thickness of said first member adjacent said aperture, each of said circumferential slots including a terminal portion and a rearward slot surface defining a distance A, from said forward end of said body portion, adjacent said axial slot and a distance B from said forward end, adjacent said terminal portion, the distance A being greater than the distance B, to draw said elongated second member toward said rearward surface of said first member as said clip member is rotated from a disengaged position wherein said second member is disposed within said axial slots toward an engaged position wherein said second member is disposed within said terminal portions of said circumferential slots.

8. The combination as claimed in claim 7 wherein said spring clip includes a plurality of flanges extending radially outwardly from said forward end of said body portion and in engagement with said forward surface of said first member.

9. The combination as claimed in claim 8 wherein each of said plurality of flanges is bent toward said rearward end of said body portion to have the outer extremities of said flanges engaging said forward surface of said first member when said spring clip is in said disengaged position.

10. The combination as claimed in claim 7 wherein said rearward surface of said first member defines an elongated groove adapted to receive said elongated second member in tight engagement therewith when said spring clip is in said engaged position.

11. In combination, a first member defining a forward surface, a rearward surface, and an aperture extending through said first member, an elongated second member disposed adjacent said rearward surface of said first member, and a one-piece spring clip comprising a generally tubular body portion disposed within said aperture and having a forward end and a rearward end, said body portion comprising first and second oppositely-disposed body halves and a bight portion joining said first and second body halves and formed integrally therewith, said first and second body halves cooperating to define first and second oppositely-disposed axial slots, sized to receive said elongated second member therein, extending from said opposite end of said body portion toward said head end, said first and second body halves defining, respectively, first and second oppositely-disposed circumferential slots, each of said circumferential slots communicating with one of said axial slots and including a terminal portion adapted to receive said elongated second member passing therethrough, each of said circumferential slots being configured to draw said elongated second member toward said rearward surface of said first member as said spring clip is rotated within said aperture from a disassembled condition with said elongated member passing through said axial slots to an assembled condition with said elongated member passing through said terminal portions.

12. A combination as claimed in claim 11 wherein said rearward surface of said first member defines an elongated groove adapted to receive said elongated second member therein to prevent substantial transverse movement of said elongated second member relative to said first member.

* * * * *